W. L. BESSOLO.
COLLAPSIBLE TOWER.
APPLICATION FILED JUNE 22, 1917. RENEWED MAY 5, 1919.

1,319,943.

Patented Oct. 28, 1919.
7 SHEETS—SHEET 1.

WITNESSES

INVENTOR
WILLIAM L. BESSOLO,
BY
ATTORNEYS

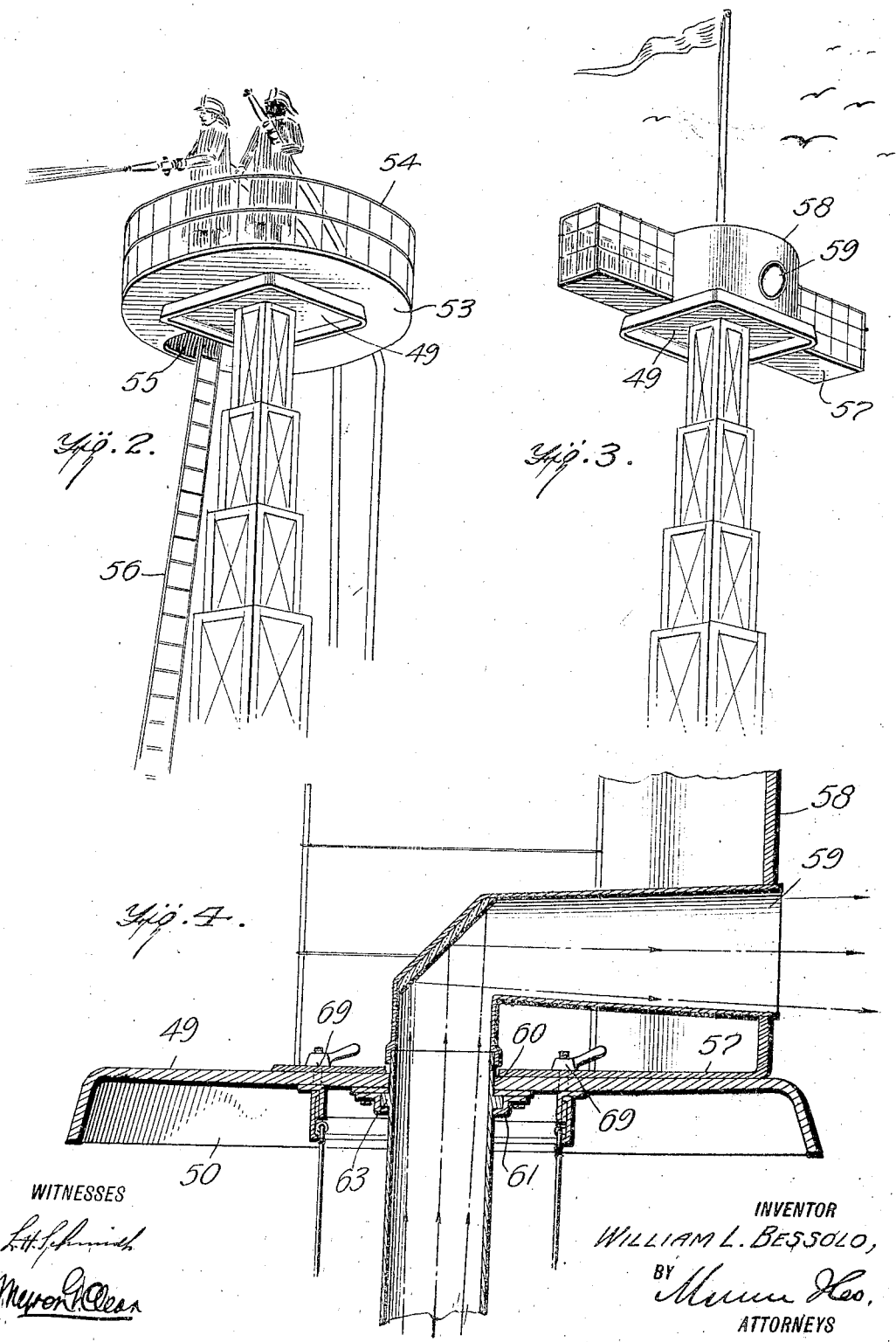

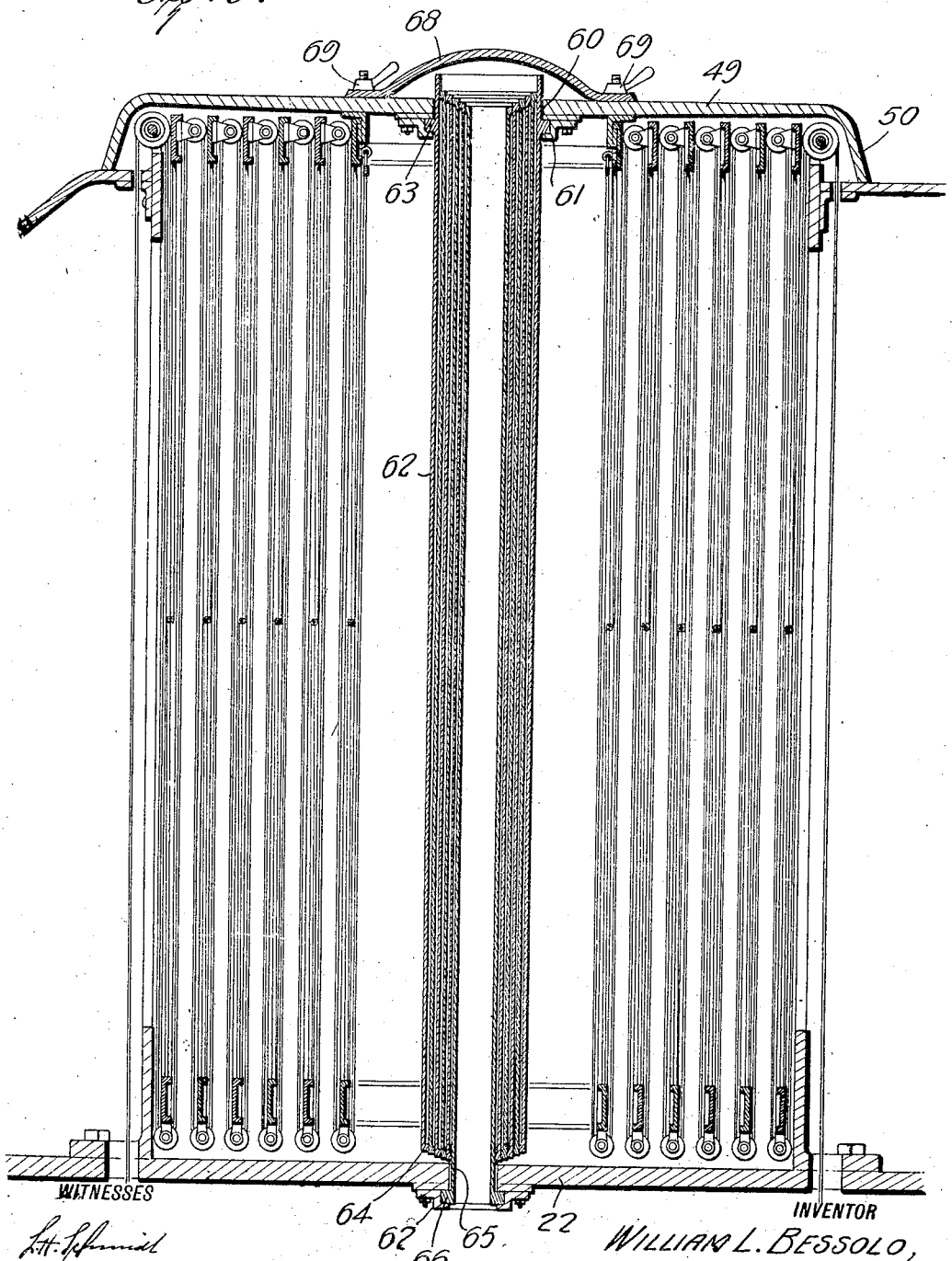

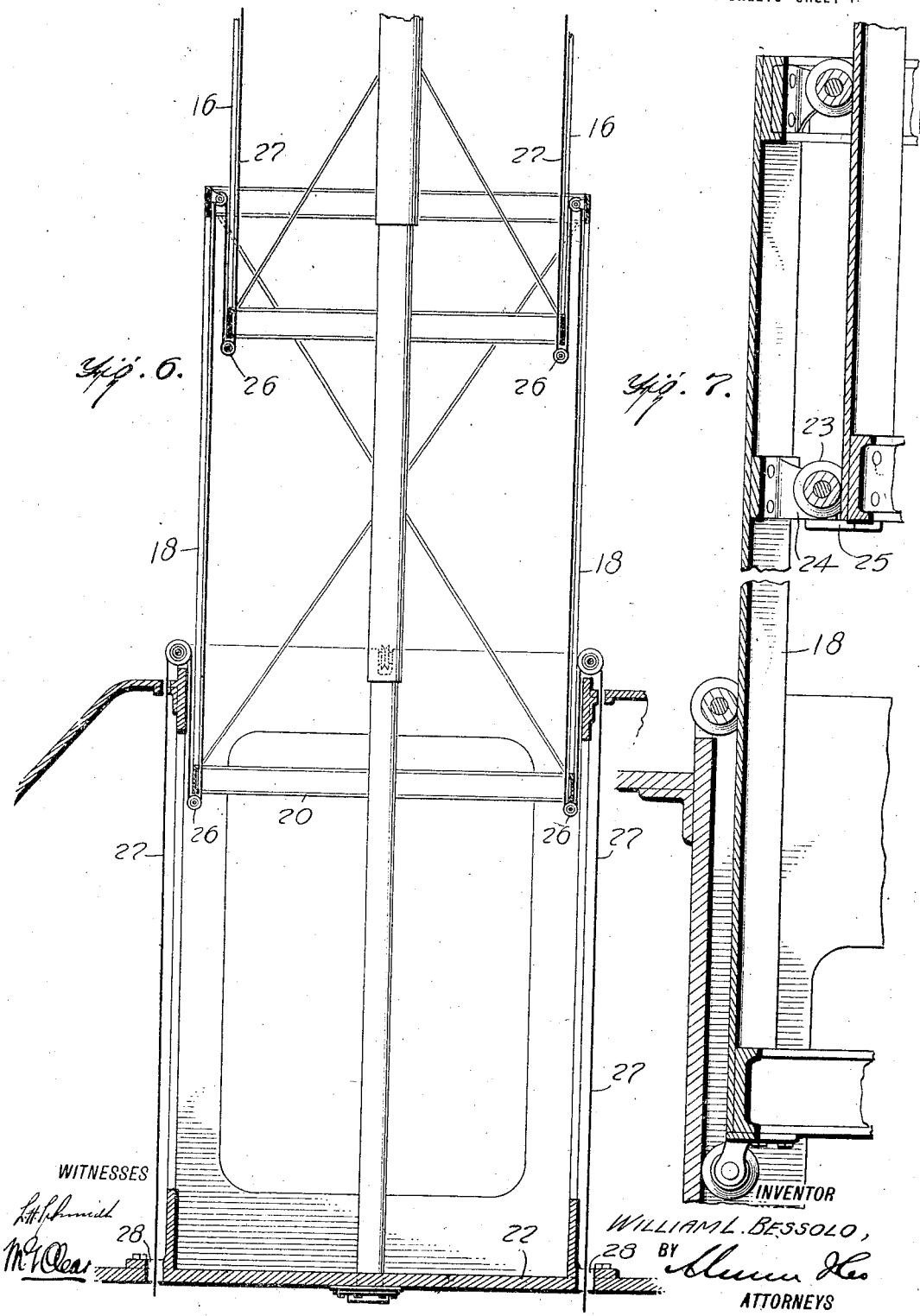

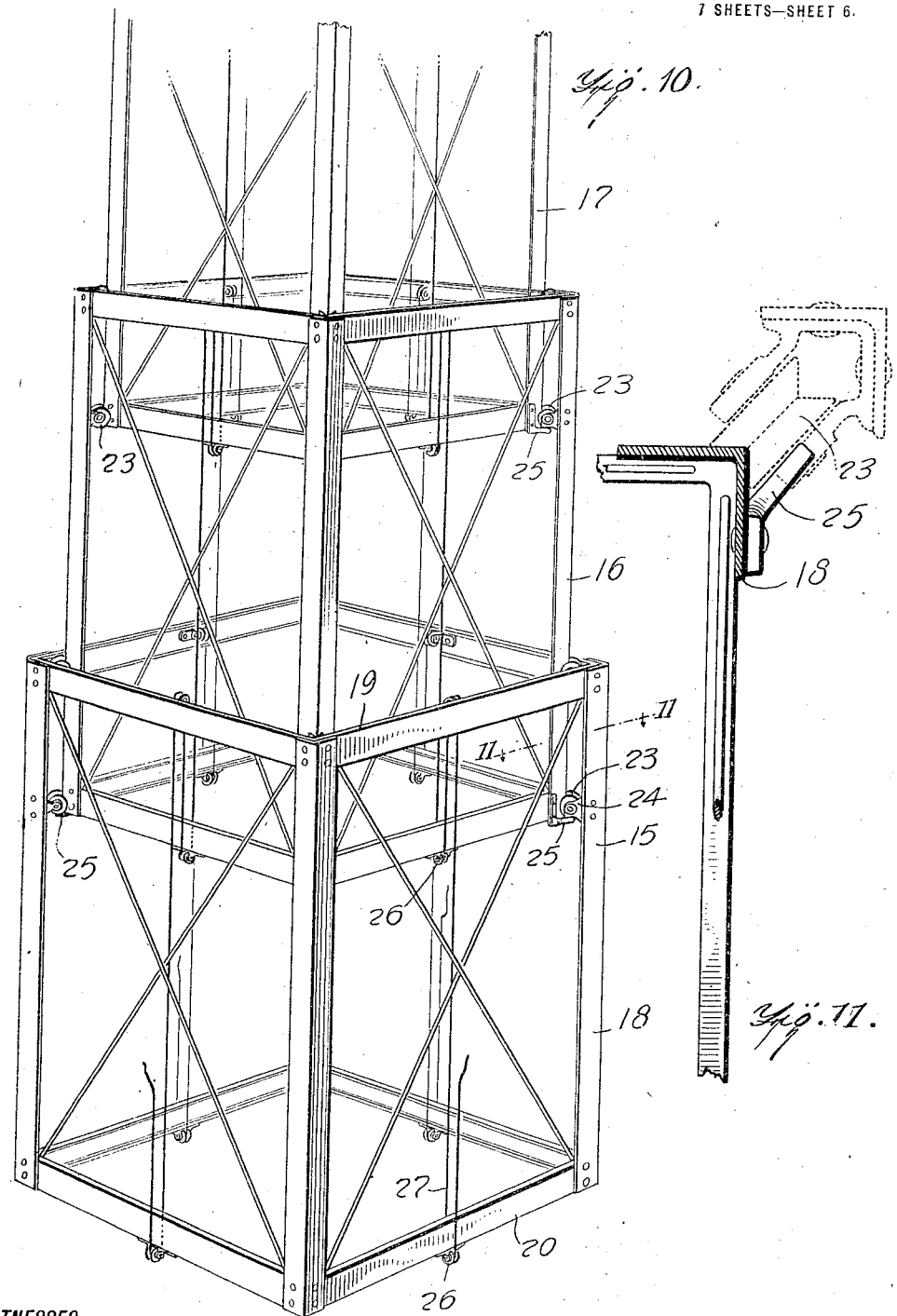

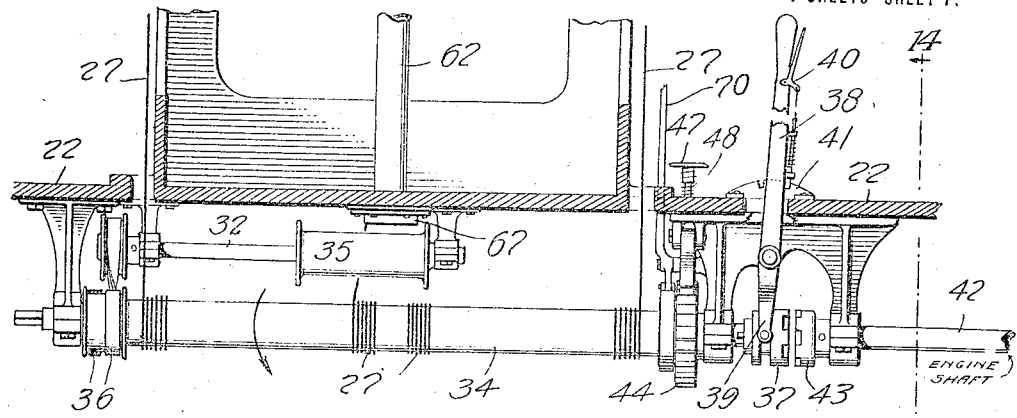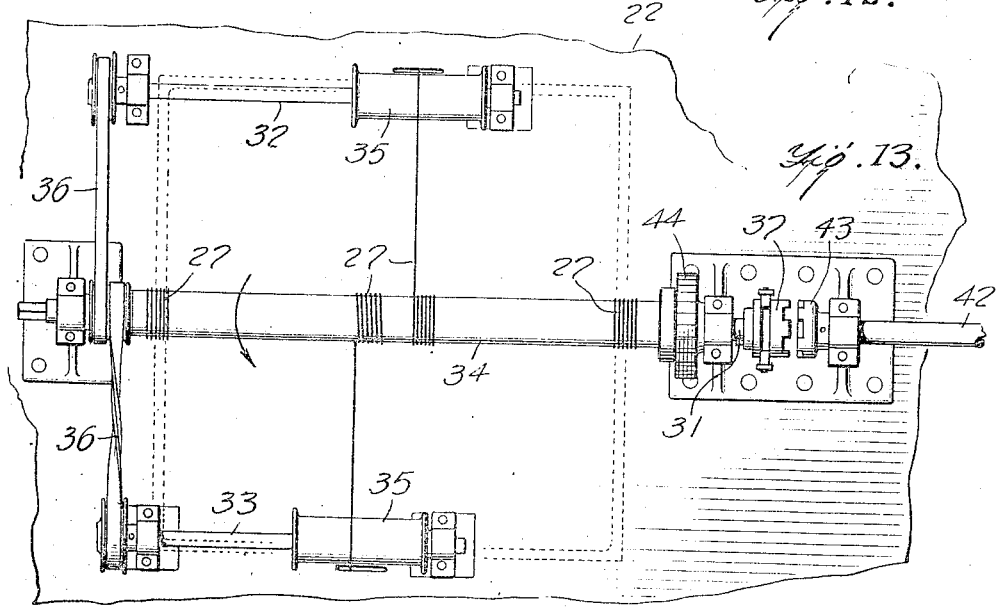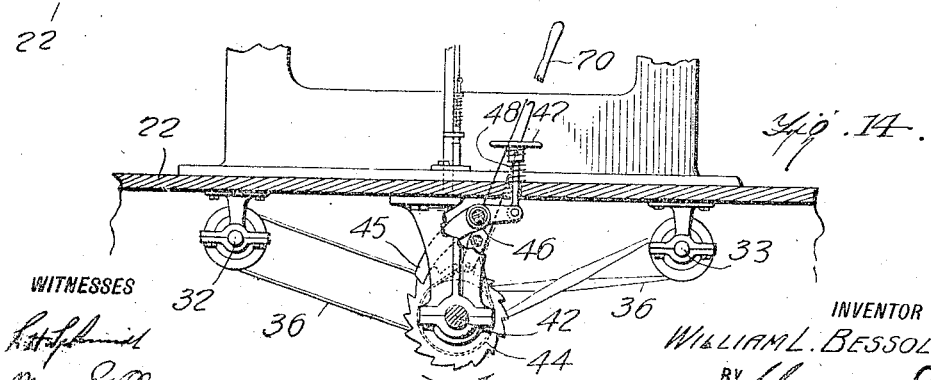

UNITED STATES PATENT OFFICE.

WILLIAM LOUIS BESSOLO, OF SAN DIEGO, CALIFORNIA.

COLLAPSIBLE TOWER.

1,319,943.　　　　Specification of Letters Patent.　　Patented Oct. 28, 1919.

Application filed June 22, 1917, Serial No. 176,352.　Renewed May 5, 1919.　Serial No. 295,028.

*To all whom it may concern:*

Be it known that I, WILLIAM LOUIS BESSOLO, a citizen of the United States, and a resident of San Diego, in the county of San Diego and State of California, have invented an Improvement in Collapsible Towers, of which the following is a specification.

My present invention relates generally to collapsible towers, and more particularly to a collapsible tower of a nature capable of wide and varied use and especially of use as a wireless tower, observation tower, elevatable gun support, or in connection with fire apparatus, my object, in the first instance, being the provision of a simple, strong and durable mechanism capable of ready, adjustable control, as well as quick elevating and collapsing movements, with minimum friction and expenditure of power.

Further objects of my invention reside in the provision of a collapsible tower construction having the advantages both as regards its adaptability to varied uses and its particular construction to be hereinafter specified and described with respect to the accompanying drawings, forming a part of this specification, and wherein—

Fig. 2 is a perspective view of a portion thereof illustrating its adaptability to use as part of fire apparatus.

Fig. 3 is a view similar to Fig. 2 illustrating the adaptability of my invention to use as an observation tower.

Fig. 4 is a vertical sectional view, on an enlarged scale, through the upper portion of the apparatus shown in Fig. 3.

Fig. 5 is an enlarged vertical section through my improved apparatus in collapsed position.

Fig. 6 is a similar view through a portion thereof in elevated position.

Fig. 7 is a vertical sectional view taken through one corner of adjacent sections of the tower.

Fig. 10 is a perspective view of a portion of the tower in elevated position.

Fig. 11 is a horizontal section in detail taken substantially on the line 11—11 of Fig. 10.

Fig. 12 is a vertical longitudinal section through the base of the tower, illustrating the controlling means and the power connections whereby the tower may be elevated and collapsed.

Fig. 13 is a bottom plan view of the parts seen in Fig. 12.

Fig. 14 is a vertical transverse section taken substantially on the line 14—14 of Fig. 12.

Figure 9:
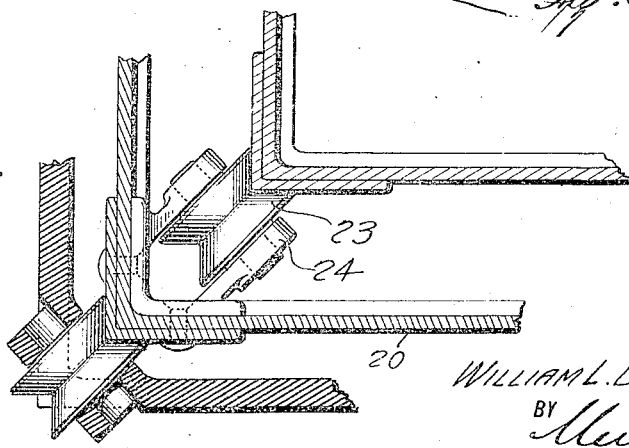
Fig. 9 is a horizontal section through one corner of certain of the parts in collapsed position.

Referring now to these figures, and particularly to Figs. 5 to 14 inclusive, my improved tower consists of a plurality of rectangular telescoping sections 15, 16, 17, of successively smaller cross sections, telescoping successively within one another, and each provided with vertical angular corner bars 18, as most plainly seen in Fig. 9, with horizontally disposed angle bars 19 and 20, respectively, connecting the upper and lower ends of the corner uprights 18, to form a skeleton structure which though rigid in itself is further strengthened and braced by means of diagonal crossing brace rods 21 at the four sides of the frame thus constituted.

The largest and lowermost frame 15 may rest flatwise upon any suitable supporting surface, though preferably formed in connection with a supporting base 22, as seen in Figs. 5 and 6, adjacent and below which are the power and controlling means whereby the tower may be readily, conveniently and quickly elevated, collapsed and controlled at all times by an operator or operators stationed at the lower portion of the tower for this purpose.

Each of the telescoping frames 15, 16, 17 thus has its corner uprights 18 in position to movably engage V-shaped rollers 23 held in corner brackets 24 of the next outermost frame or section of the tower, arranged at and adjacent the top thereof, each section or frame having at its lower end outwardly projecting lugs or arms 25 for engagement beneath the lowermost roller of the next outermost section to limit relative vertical movement of the sections to the extended position as seen in Fig. 9 in particular.

Each of the sections is, furthermore, provided at all four sides thereof and upon its upper and lower cross bars 19 and 20, with centrally disposed rollers or pulleys 26 over which are extended the operating cables 27 extending upwardly beneath the lowermost rollers and downwardly over the uppermost rollers throughout the series of frames or sections whereby downward pull on the lower ends of the cables will cause elevation of the entire series.

Figure 1:
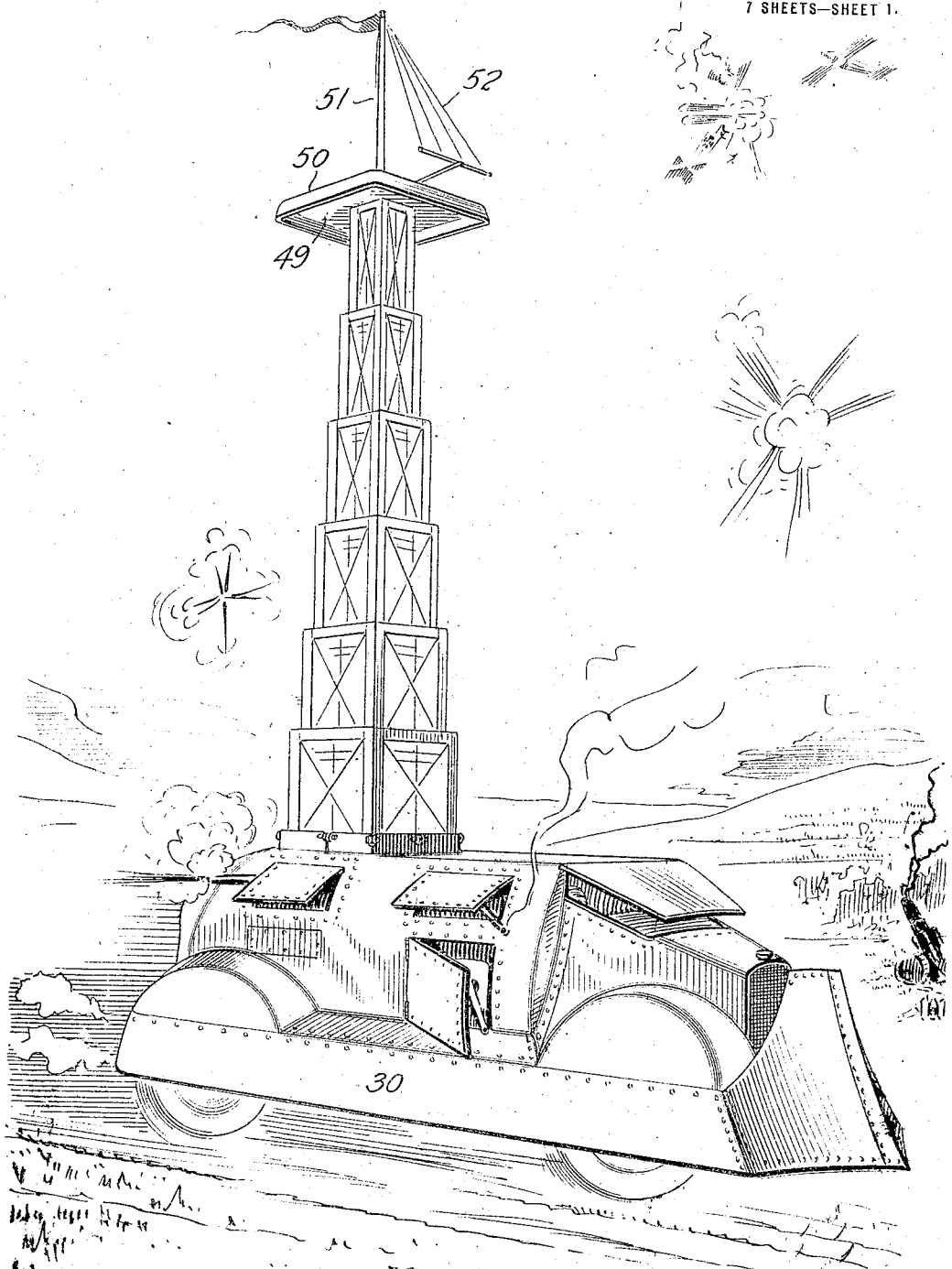
Figure 1 is a perspective view illustrating the practical application of my invention to use as a wireless tower and illustrating its adaptability to mobile support.
Figure 8:
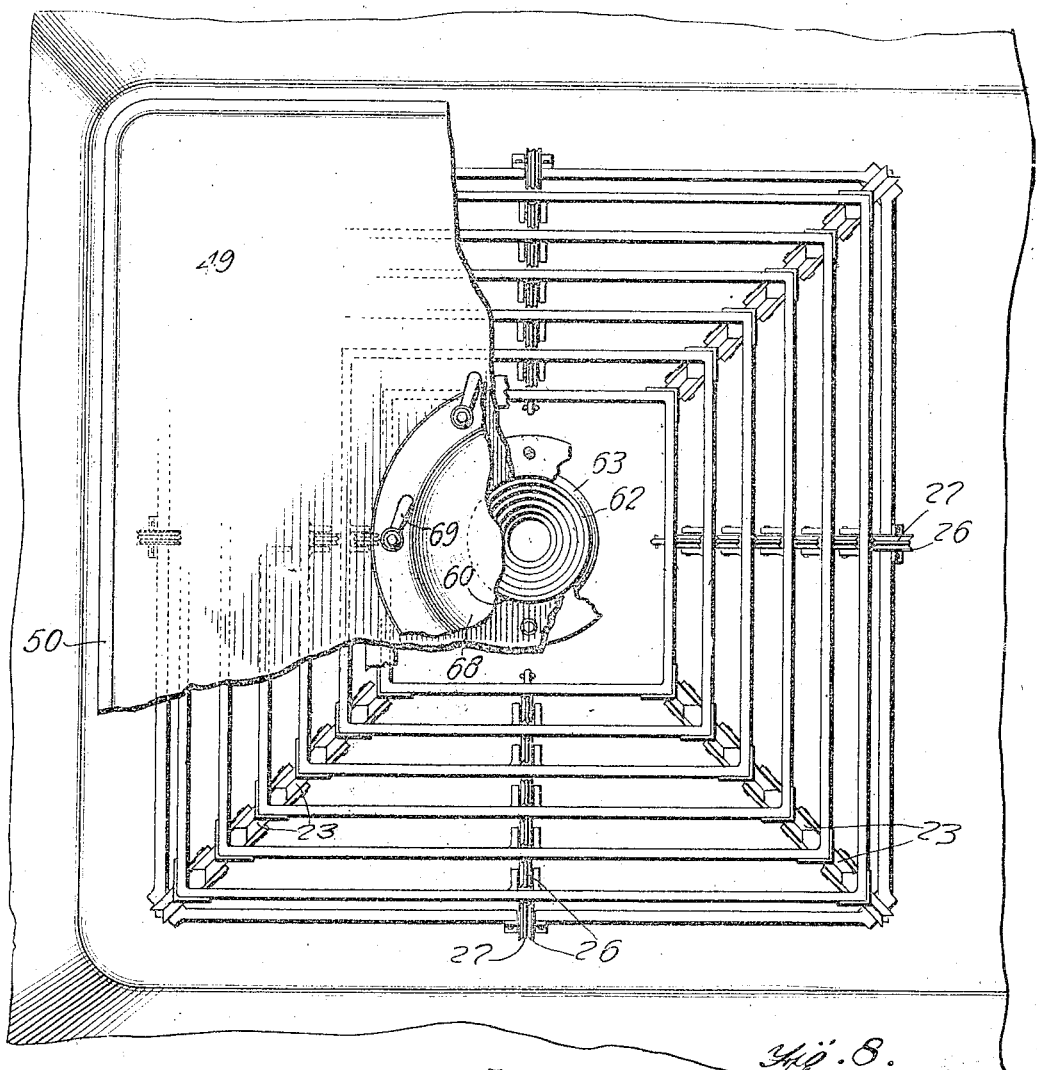
Fig. 8 is a top plan view of the parts shown in Fig. 5, with certain of the said parts broken away.

The lowermost section or frame of the tower which is secured upon or formed in connection with a base plate 22, as before stated, and which is of somewhat similar shape to the several other sections, has openings 28 downwardly through which the elevating cables 27 extend. This base 22 may, as before stated, be either anchored or secured in connection with a portable frame such as an armored vehicle 30, as seen in Fig. 1, and is in either instance provided with a controlling mechanism for the tower located subjacent thereto. This controlling mechanism in the simple form, as proposed by my invention and as seen in Figs. 12, 13 and 14, consists of a central pulley shaft 31 and two side pulley shafts 32 and 33, the former having an elongated pulley 34 and the latter having pulleys 35. At one end the shaft 31 is connected to the shafts 32 and 33 by belts 36 so that the several parallel shafts mentioned will, with their pulleys, be driven in consonance.

The pulley 34 being disposed at right angles to, and in the plane of the axis of, the tower, below the base of the latter, as seen in Fig. 13, will receive adjacent its opposite ends certain of the cables 27 of opposite sides of the tower, while the cables 27 of the other opposing sides of the tower will extend to and around the central portions of the pulley 34 after passage angularly around the pulleys 35.

At its opposite end the central pulley shaft 31 has a splined clutch member 37 controlled in its movement by a lever 38, the lower end of which has a yoke 39 engaging an annular groove of the clutch member 37, and the upper end of which projects upwardly through the base 22 and has a latch mechanism 40 in engagement with a stationary notched quadrant 41.

The pulley shaft 31 is, furthermore, arranged in the axial plane of a power shaft 42, which may be the shaft of the motor of the armored car 30, or a shaft suitably connected thereto, and which has a stationary clutch member 43 opposing the clutch member 37, before described, and adapted for engagement by the latter under control of the lever 38 by means of which the clutch members may be locked in engaged and disengaged position.

Adjacent the clutch member 37 the main pulley 34 is, furthermore, provided with a ratchet wheel 44 engaged by a pawl 45, as best seen in Fig. 14, fulcrumed at 46 beneath the base 22 and controlled by a foot piece 47 projecting above the base and through an opening thereof, by a spring 48 adjacent the foot piece, the latter of which normally holds the pawl in engaged position.

Thus when the clutch member 37 is shifted into engagement with the stationary clutch member 43, the pulleys 34 and 35 will be rotated to wind the several controlling cables of the tower upon the former, with minimum friction, so as to elevate the several sections of the tower to the position shown in Fig. 1 by the utilization of minimum power for this purpose, and in such manner as to bring about minimum wear of the parts in either this operation or the downward movement of the several sections or frames to collapsed position when the movable clutch 37 is released and the foot piece 47 depressed to release the ratchet pawl, the function of which is to normally prevent retrograde movement of the pulley 34.

By referring to Fig. 5 it will be noted that the upper end of the innermost section or frame of the tower supports a platform 49 of generally rectangular formation and at least large enough to completely cover and protect the upper ends of the several sections or frames in collapsed position, as plainly seen in the figure mentioned, for which purpose the platform 49 has a downwardly flanged surrounding edge 50. This platform 49 may itself support suitable mechanism to be utilized in connection with the tower, as, for instance, the short mast 51 and antennae 52 of the wireless apparatus for the support of which the tower is utilized, as seen in connection with the armored car 30 of Fig. 1.

As seen in Fig. 2 the platform 49 is utilized as a support upon which is suitably secured an additional larger platform 53, the latter having a surrounding rail 54 and a lower opening 55, through the latter of which is extended the upper end of the ladder 56 to provide for the ready ascension and descension of firemen and others in connection with the utilization of the tower as part of fire apparatus.

As seen in Figs. 3 and 4, a supplemental observation platform 57 may be secured to the platform 49 having an intermediate shield portion 58 through which opens the upper end 59 of a periscope.

Referring again to Fig. 5 it will be noted that the platform 49 has a central opening 60 beneath which is an annular bracket 61 rotatably supporting the upper end of the outer section 62 of a series of tubular sections which extend and collapse with the sections or frames of the tower to form a tubular mast vertically through the tower, as seen in Fig. 6, for various purposes, as, for instance, a support, or as a part of the periscope seen in Figs. 3 and 4.

In supporting the outer section 62 of this tube, the bracket 61 engages an external annular rib 63 of said section, the several sections having relatively engaging external and internal annular ribs 64 at their upper and lower ends which provide for their connection with one another as the tower is elevated, the inner section 65 of the tube having a lower external annular rib 66 engaged and supported by a bracket 67 secured to the lower face of the base 22.

In the normally collapsed position of the parts the opening 60 of the platform 49, and consequently the upper ends of the several sections of the central collapsible tube of the tower, is covered and protected by a concavo-convex plate 68 held by quick detachable connecting members 69, and which is removed when the supplemental platforms of Figs. 2 and 3 are disposed upon the platform 49.

It is to be observed further that means may be provided in connection with the several sections of the inner axial tube of the tower for the control through this tube of certain means at the upper end of the elevated tower, as, for instance, the control of nozzle holding devices in connection with fire apparatus, or the control and shifting of the upper angular portion 59 of the periscope, of which, as before stated, the tube forms a part in the apparatus illustrated in Figs. 3 and 4.

Having thus made it plain as to how my invention is constructed and the manner in which the tower and its parts are manipulated and controlled, it will be obvious that its uses are various and are not to be limited to those shown and described by way of illustration only. It is further obvious that the construction itself is capable of variation and modification within considerable limits in adapting the invention to these uses and that for this, if for no other reason, the foregoing specification is to be taken as limiting the invention merely to the terms of the appended claims.

It is also to be observed from Figs. 12, 13, and 14 that a brake 70 may be provided in connection with the drum 34 for use with the clutch and the dog 45 disengaged in lowering the several sections of the tower to collapsed position, and that, due to the ease with which the invention may be manipulated, that is, placed in position and either elevated or collapsed, it is capable of effective use in supporting an aerial cableway or bridge over a river stream or section of impassable ground.

I claim:—

1. In a collapsible tower, a series of telescoping frames having roller connections forming guides for their extension and collapsing movements, each of said frames being rectangular in form and including angle bars disposed at the corners thereof in upright positions, similar horizontally disposed angle bars connecting the upper and lower ends of said uprights, each of the frames having brackets extending inwardly therefrom, V-shaped rollers carried by the said brackets and engaging the corner uprights of the next innermost frames to form said roller connections, each of the removable frames having externally projecting lugs at their lower ends for engagement with the said rollers to limit relative movement of the frames toward the extended positions.

2. In a collapsing tower, a series of telescoping rectangular frames having relatively engaging means to guide their extension and collaping movements, and a supporting member disposed axially of the tower and in telescoping sections, the inner and outer sections of which are connected to opposite ends of the tower.

3. In a collapsible tower, a plurality of rectangular frames, a platform secured to the upper end of the innermost section, a base upon which the tower is disposed, said platform and said base having centrally disposed securing means and an axially disposed tube in telescoping sections, the upper and lower ends of which are engaged by the securing means of the platform and the base, for the purpose described.

4. In a collapsing tower, a series of rectangular telescoping frames, a base upon which the frames are disposed, a platform secured to the upper end of the innermost frame, said platform and said base having openings axially of the tower and provided with annular brackets disposed thereon at one side of the openings, an inner tubular member in telescoping sections having its upper and lower ends extended into the openings of the platform and base and provided with annular ribs engaged by the annular brackets of the platform and base, for the purpose described.

WILLIAM LOUIS BESSOLO.